April 9, 1968 R. A. NELSON ET AL 3,377,624
MEMORY PROTECTION SYSTEM
Filed Jan. 7, 1966
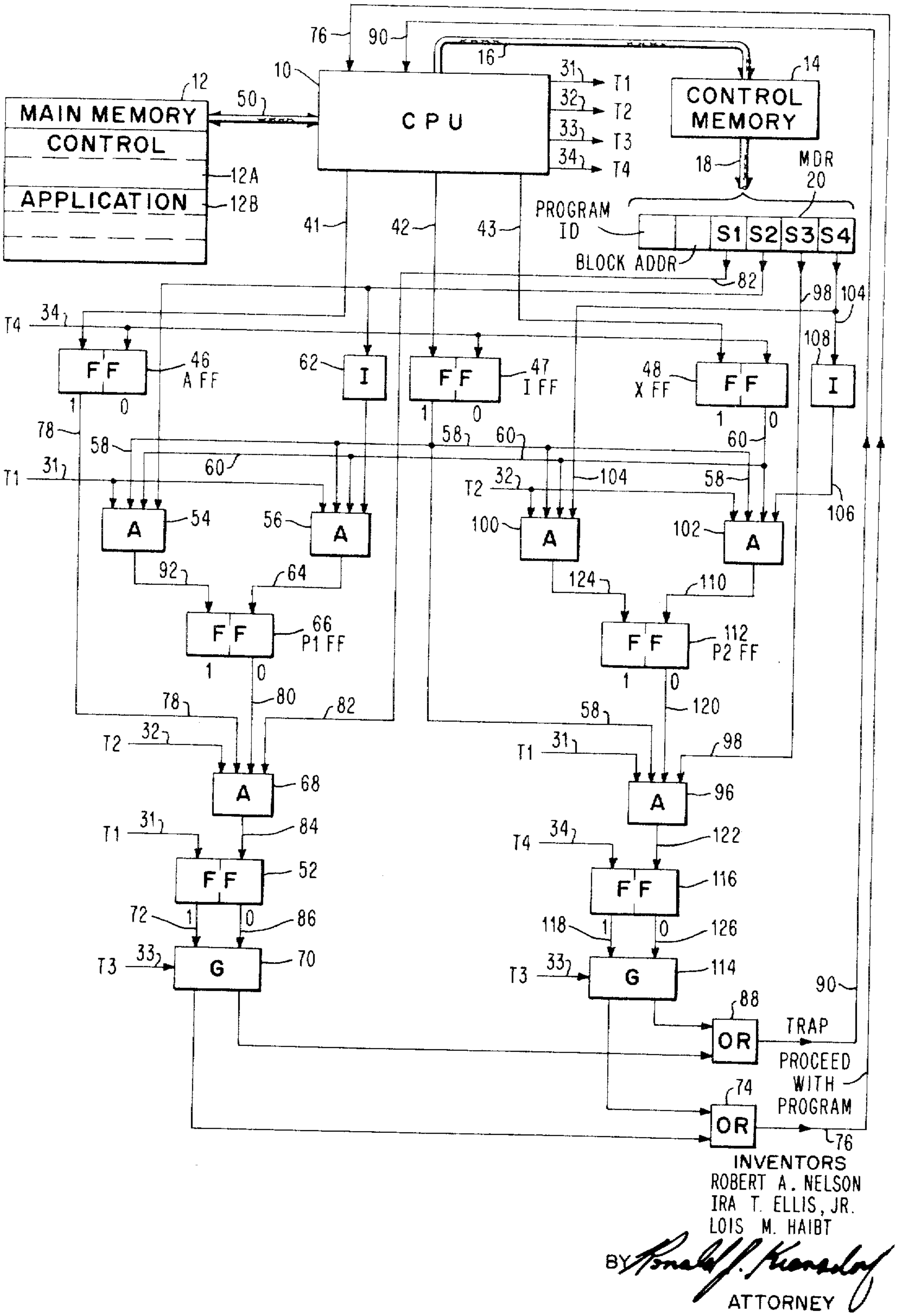
INVENTORS
ROBERT A. NELSON
IRA T. ELLIS, JR.
LOIS M. HAIBT
BY [signature]
ATTORNEY

United States Patent Office 3,377,624

Patented Apr. 9, 1968

3,377,624

MEMORY PROTECTION SYSTEM

Robert A. Nelson, Yorktown Heights, Ira T. Ellis, Jr., Ossining, and Lois M. Haibt, Katonah, N.Y., assignors to International Business Machines Corporation, Armonk, N.Y., a corporation of New York Filed Jan. 7, 1966, Ser. No. 519,347

14 Claims. (Cl. 340—172.5)

This invention relates to memory protection systems and more particular to a system for flexibly controlling the interactions between various programs residing in the memory of a digital computer system.

The memory of an electronic digital computer generally contains instructions and data which are combined and grouped to form a plurality of different programs. One or more of these programs may be considered as applications or utility programs which, when running, cause a desired problem to be solved or perform some other utilitarian function. The remaining programs are control programs (i.e., supervisors, monitors, etc.) which determine the sequence in which the application programs are to be performed, check for errors in these programs, and perform a variety of other housekeeping and control functions which are essential to the operation of the computer. When the computer is being operated in a multi-program mode, as with time-sharing, the various applications programs may be operated for different uses and it is, therefore, desirable that the computer be set up so that one applications program may be prevented from gaining access to another. Also, while it is often necessary for information from one of the control programs to be written into one of the applications programs and for the system to be able to transfer from various points in a control program to selected points in the applications programs, the operation of the computer could be seriously disrupted if the control programs were altered by one of the applications program or if, due to an error in programming, a transfer was made from an applications program into one of the control programs. A spurious transfer into the middle of a control program could cause alterations therein which would disrupt the normal operation of the computer.

In the past, the problem of preventing data from being written from one program into another or control from being transferred from one program to another in an undesired manner has been handled by providing an identifier bit-combination, or key, for each program, and preventing the programs which do not possess this bit combination, or key, from gaining access to the program. This tieing of the memory protection feature to the computer memory itself imposes severe limitations on the manner in which the programs may be grouped for permitting and denying access. Far greater flexibility in controlling the manner in which the programs are to be given access to each other can be achieved if separate logical controls and memory are provided for the memory protection feature. Such separate logical control and memory would permit any desired program to either be permitted or denied access to any other program, and would also permit distinctions to be made between various types of accesses. For example, one program might be permitted to write into another program while not being permitted to transfer control to that program.

It is therefore a primary object of this invention to provide an improved memory protection system.

A more specific object of this invention is to provide a memory protection system which affords greater flexibility in the control of inter-actions between various programs.

A still more specific object of this invention is to provide a memory protection system which has the ability to distinguish between the various types of accesses to a computer program and to permit one type of access between two programs while denying other types of accesses.

A feature of this invention is the provision of a separate logical memory and control for performing the memory protection function.

In accordance with the above objects, this invention provides a logical memory which contains at least one entry for each logical block of information in the computer memory. This entry indicates whether the associated block is privileged ot make various types of accesses to other blocks, and also whether the associated block is conditionally protected against various types of accesses from other blocks. Where more than one entry exists in the logical memory for a block of information, the entries contain an additional field identifying the running program. Therefore, an information block may be conditionally protected as to certain types of accesses for one program and either unprotected or conditionally protected as to other types of accesses for another program.

When an instruction requiring an access is recognized, a determination is made as to whether the block containing this instruction is privileged. The entry in the logical memory for block containing the address to which the access is to be made and the running program is then investigated and a determination made as to whether the block is conditionally protected for the type of access being made by the running program. If it is found that the accessing instruction is not privileged and that the block being accessed is conditionally protected, then an interrupt is generated. If one of the other three conditions which may occur exists, the access is permitted.

The foregoing and other objects, features, and advantages of the invention will be apparent from the following more particular description of a preferred embodiment of the invention, as illustrated in the accompanying drawing.

The single figure is a block diagram of an illustrative embodiment of the invention.

Referring now to the figure, it is seen that the system includes a central processing unit (CPU) 10 having a main memory 12 associated with it. CPU 10 may be any one of a large number of standard general purpose digital computers. Memory 12 may, for example, be a magnetic core matrix memory array. Main memory 12 contains, in section 12A thereof, one or more control programs, and in section 12B, one or more applications programs. Sections 12A and 12B of memory 12 may be further subdivided into blocks containing a like number of entries with a given program being contained in one or more of the blocks.

The system of this invention also contains a control memory 14 which has at least one entry for each of the blocks in main memory 12. When a word of a block in main memory 12 is accessed under control of a program running in CPU 10, signals are also applied through lines 16 to control memory 14 to cause a corresponding entry therein to be read out through lines 18 into memory data register (MDR) 20. From MDR 20 it is seen that, for the illustrative embodiment of the invention, each entry in control memory 14 contains six fields. Reading from left to right, these fields are a multi-bit program ID field which identifies the running program which the entry for the block is associated with; a multi-bit block address field; a one-bit field, designated the S1 field, which is set to 1 for those blocks containing programs which are conditionally write protected; a one-bit field, designated the S2 field, which is set to 1 if the program in the corresponding block is privileged to alter conditionally protected blocks; a one-bit field, designated the S3 field, which is associated with those blocks which may not be transferred into except from branch instructions contained in a transfer privileged block (i.e., those blocks which are conditionally transfer protected); and a one-bit field, designated the S4 field, which is set to 1 for those blocks which are transfer privileged. Where several programs in memory 12 have the same protection characteristics, a common program ID code may be employed to designate all of them, and a single entry, bearing the common program ID code in its left-most field, may be used, in control memory 14, for each block in memory 12 for all of the programs. For purposes of illustration, it will be assumed that the S1–S4 bits associated with the blocks for the control programs in section 12A in main memory 12 are all set to 1 indicating that the control programs are both transfer protected and privileged while the blocks for the application programs in section 12B in memory 12 have only the S1 field set to 1 indicating that these blocks are conditionally write protected but are not transfer protected and are neither write or transfer privileged.

Referring again to CPU 10, it is seen that, in addition to the outputs already mentioned, CPU 10 has a clock therein which, each time an access is made to main memory 12, causes pulses to sequentially be applied to clock lines 31–34. The lines 31–34 are also designated the T1–T4 lines respectively. In order to simplify the drawing, no attempt has been made to connect the lines 31–34 to the various points in the circuit where they are utilized. Instead, at each of these points a line appears bearing the appropriate number and letter designation. CPU 10 also generates output signals on lines 41–43 which are connected to set flip-flops 46–48 respectively to their ONE state. Flip-flop 46 is also designated the A flip-flop and it is set to its ONE state when the instruction being performed by CPU 10 is an active (store type) reference. In other words, flip-flop 46 is in its ONE state when the contents of a word in main memory 12 is being altered. Flip-flop 47 is also designated the I flip-flop and is in its ONE state when an instruction fetch is being performed. An instruction fetch will always precede any instruction including a store type instruction. Therefore, there will always be an I cycle (i.e., the I flip-flop set to its ONE state) before there is an A cycle (the A flip-flop set to its ONE state). Flip-flop 48 is also designated the X flip-flop and is set to its ONE state for the cycle following the performance of an execute-type instruction by CPU 10. An execute-type instruction is one which requires that the instruction at some specified address in memory 12 be performed. It differs, however, from a branch instruction in that, once the instruction at the specified address has been performed, control of the system is returned to the instruction following the execute instruction, rather than to the instruction following the address specified by the execute instruction.

*Operation*

In describing the operation of the system, assume first that an application program is running and that, for some reason, this program attempts to write into one of the control programs. As indicated previously, this is an undesired operation and should cause a trap, or interrupt to occur. As a first step in the operation, the instruction from the applications program in section 12B of main memory 12 is fetched and applied through lines 50 to CPU 10. Since an instruction fetch is being performed, a signal is applied to I line 42 to set I flip-flop 47 to its ONE state. Signals are also applied through lines 16 to control memory 14 to cause the entry therein, corresponding to the running program and the block in main memory 12 containing the instruction indicated above, to be read into MDR 20. If control memory 14 is an associative memory, the signals on lines 16 may, for example, cause an associate operation to be performed on the program ID and block address fields with the entry having a matching program ID and block address field being read out into MDR 20. Since the block containing the instruction is in applications section 12B of main memory 12, the entry read into MDR 20 at this time contains a 1 bit in the S1 field and 0 bits in fields S2–S4.

When the above-described preliminary operations have been completed, CPU 10 applies a signal to T1 line 31. The signal on T1 line 31 is applied to set flip-flop 52 to its ONE state and is also applied to condition AND gates 54 and 56. Other operations under the control of T1 line 31 are not pertinent at this time, and will be described later. Since I flip-flop 47 is in its ONE state, a signal is applied through ONE side output line 58 from this flip-flop to a second input of AND gates 54 and 56. Similarly, X flip-flop 48 being in its ZERO state causes a signal to be applied through ZERO side output line 60 from this flip-flop to a third input of AND gates 54 and 56. Since the S2 field in MDR 20 is 0 at this time, a signal is applied by inverter 62 to the fourth input of AND gate 56 fully conditioning this AND gate to generate an output signal on line 64 which is applied to set P1 flip-flop 66 to its ZERO state.

The signal on T1 line 31 is followed by a signal on T2 line 32 which signal is applied as one input to AND gate 68. However, since A flip-flop 46 is in its ZERO state, AND gate 68 is not fully conditioned. The other points in the circuit to which T2 line 32 is applied not being pertinent at this time, no operations are performed at T2 time. The signal on T2 line 32 is followed by a signal on T3 line 33 which is applied to condition gate 70. The other points in the circuit to which T3 line 33 is applied will be described later. Since flip-flop 52 was set to its ONE state at T1 time, gate 70 is conditioned to pass the signal on ONE-side output line 72 from this flip-flop through OR gate 74 to line 76. Line 76 is applied to CPU 10 to cause the normal program sequence to proceed. The signal on T3 line 33 is followed by a signal on T4 line 34 which, for purposes of present discussion, serves only to reset flip-flops 46–48 to their ZERO state.

When the instruction is in CPU 10, it is decoded. Assume that the instruction is "store contents of accumulator at address N" where N is an address in section 12A of main memory. When this operation is decoded, a signal is applied through line 41 to set A flip-flop 46 to its ONE state and signals are applied through lines 16 to cause the entry in control memory 14 corresponding to the program ID for the running program and the block in main memory 12 containing the address where the store is to be made to be read out through lines 18 into MDR 20. It has been assumed, for the purposes of this example, that the address where the information is to be stored is in control portion 12A of main memory 12. It will be remembered that entries in this portion of the memory have 1 bits in fields S1–S4. When the primary operations have been completed, CPU 10 applies a signal to T1 line 31. As before, only such points in the circuit, to which the signals on lines 31–34 are applied, which are pertinent to the present discussion will be mentioned. The signal on T1 line 31 is applied to again set flip-flop 52 to its ONE state and is also applied as a conditioning input to AND gates 54 and 56.

Since I flip-flop 47 is in its ZERO state at this time, there is no signal on line 58 and therefore, neither AND gate 54 or 56 is conditioned. The signal on T1 line 31 is followed by a signal on T2 line 32 which is applied as an input to AND gate 68. A flip-flop 46 being in its ONE state at this time causes a signal to be applied through line 78 to a second input of AND gate 68. It will be remembered that P1 flip-flop 66 was set to its ZERO state during the preceding cycle. A signal is therefore applied through ZERO-side output line 80 from this flip-flop to a third input of AND gate 68. The final input to AND gate 68 is output line 82 from the S1 field of MDR 20. Since there is a 1 bit in this field, AND gate 68 is fully conditioned at T2 time to generate an output signal on line 84 which is applied to set flip-flop 52 to its ZERO state.

The signal on T2 line 32 is followed by a signal on T3 line 33 which is applied to condition gate 70. Since flip-flop 52 is now in its ZERO state, it is generating a signal on its ZERO-side output line 86. This signal is applied through conditioned gate 70 and OR gate 88 to line 90. The signal on line 90 is applied to CPU 10 to cause a trap or interrupt to occur. When CPU 10 recognizes the interrupt condition, it calls upon a subroutine in a control program to return control of the program to a predetermined location and to restart it. The signal on T3 line 33 is followed by a signal on T4 line 34 which signal is applied to reset A flip-flop 46 to its ZERO state.

To further illustrate the operation of the circuit, assume now that the "store contents of accumulator at address N" instruction originates in a control program in section 12A of main memory 12 and that the address N is in section 12B of the memory. Under these conditions, for the first cycle of the CPU clock, I flip-flop 47 is in its ONE state and there are 1 bits in fields S1–S4 of MDR 20. At T1 time this causes AND gate 54 to be fully conditioned to generate an output signal on line 92 which is applied to set P1 flip-flop 66 to its ONE state. At T1 time flip-flop 52 is also set to its ONE state. Since A flip-flop 46 is in its ZERO state, nothing happens at T2 time. However, at T3 time, gate 70 is conditioned to pass the signal on ONE-side output line 72 from flip-flop 52 through OR gate 74 to proceed-with-program line 76. This permits CPU 10 to proceed with the normal program sequence. During the second cycle of the CPU clock A flip-flop 46 is in its ONE state, there is a bit in the S1 field of MDR 20 and the remaining S fields in MDR are set to 0. Under these conditions, the T1 signal again sets flip-flop 52 to its ONE state but is ineffective to cause any alteration in the setting of P1 flip-flop 66. P1 flip-flop 66 therefore remains in its ONE state. At T2 time there are signals on lines 32, 78, and 82. However, since P1 flip-flop 66 is in its ONE state, there is no signal on ZERO-side output line 80 from this flip-flop. AND gate 68 therefore has one of its inputs missing and flip-flop 52 is therefore left in its ONE state. At T3 time gate 70 is again conditioned to pass the signal on ONE-side output line 72 from flip-flop 52 through OR gate 74 and proceed-with-program line 76 to CPU 10. The operation is concluded with a signal on T4 line 34 which resets A flip-flop 46 to its ZERO state.

From the above, it has been seen how a trap occurs when an instruction from a non-privileged block attempts to write into a write-protected block and how a write-privileged block is permitted to write into a write-protected block. It can further be seen that any of the control programs in section 12A of main memory, which programs are write privileged, can write into any of the other control programs, even though these programs are conditionally write protected, as well as writing into the conditionally protected applications programs. Similarly, none of the applications programs, which programs are not write privileged, may write into any of the other applications programs which are conditionally write protected.

The status bits in the S3 and S4 fields of control memory 14 and MDR 20 are used to illustrate a slightly different mode of protect operation. To illustrate how these status bits are used, assume first that one of the applications programs in section 12B of main memory is running and that a branch instruction occurs which causes a branch into one of the control programs in section 12A. Under these conditions, when the instruction is fetched from memory 12, CPU 10 applies a signal through line 42 to set I flip-flop 47 to its ONE state and applies signals through lines 16 to control memory 14 to cause the entry corresponding to the program ID for the running program and the block in main memory 12 containing the branch instruction to be read out through lines 18 into MDR 20. As has been previously indicated, it is assumed that an entry in control memory 14 corresponding to a block in section 12B of the main memory has its S1 status bit set to 1 and the remaining status bits set to 0. When CPU 10 has completed the preliminary operations, it applies a signal to T1 line 31 which, in addition to the functions previously mentioned, is also applied as one input to AND gate 96. A second input to AND gate 96 is output line 98 from the S3 field of MDR 20. Since this field is set to 0 at this time, AND gate 96 is not conditioned and no operations are performed at T1 time.

The signal on T1 line 31 is followed by a signal on T2 line 32 which is applied as one input to AND gates 100 and 102. ONE-side output line 58 from I flip-flop 47 and ZERO-side output line 60 from X flip-flop 48 are applied as two additional inputs to AND gates 100 and 102. The final input to AND gate 100 is output line 104 from the S1 field of MDR 20 and the final input to AND gate 102 is output line 106 from inverter 108, the input to inverter 108 being the beforementioned line 104. Since the S4 field in MDR is 0 at this time, inverter 108 is generating an output signal on line 106 to fully condition AND gate 102 causing an output signal on line 110 which is applied to set P2 flip-flop 112 to its ZERO state.

The signal on T2 line 32 is followed by a signal on T3 line 33 which is applied to condition gate 114. It is assumed that flip-flop 116 was set to its ONE state during a previous T4 time. Since this flip-flop was not altered during the present clock cycle, it is now generating an output signal on ONE-side output line 118 which signal is applied through conditioned gate 114, OR gate 74 and proceed-with-program line 76 to CPU 10 to permit the program running therein to continue.

The signal on T3 line 33 is followed by a signal on T4 line 34 which is applied to the ONE-side input of flip-flop 116 and to the ZERO-side input of I flip-flop 47.

It has been assumed that the branch instruction, when decoded, causes a transfer to an instruction contained in control section 12A of main memory 12. Prior to performing this operation the CPU therefore applies a signal through line 42 to set I flip-flop 47 to its ONE state and signals through lines 16 to read out the entry in control memory 14 which corresponds to program ID for the running program and the block containing the instruction being branched to. It will be remembered that entries for blocks in control portion 12A have all their status bits set to 1. When these preliminary operations have been completed, a signal is again applied through T1 line 31 to one input of AND gate 96. The signal on output line 98 from the S3 field of MDR 20 is applied as a second input to AND gate 96 and the signal on ONE-side output line 58 from I flip-flop is applied as a third input to this AND gate. Since P2 flip-flop 112 was set to its ZERO state during the preceding cycle, there is a signal on ZERO-side output line 120 from this flip-flop which is applied to fully condition AND gate 96 to generate an output signal on line 122. The signal on line 122 is applied to reset flip-flop 116 to its ZERO state. The signal on T1 line 31 is followed by a signal on T2 line 32 which, in conjunction with the signal on ONE-side output line 58 from I flip-flop 47, the signal on ZERO-side output line 60 from X flip-flop 48, and the signal on output line 104 from the S4 field of MDR fully conditions AND gate 100 to generate an output signal on line 124 which signal is applied to set P2 flip-flop 112 to its ONE state. The setting of the P2 flip-flop to its ONE state at this time indicates that the instruction now being performed is a transfer privileged instruction. The signal on T2 line 32 is followed by a signal on T3 line 33 which signal is applied to condition gate 114. Since flip-flop 116 is now in its ZERO state, a signal appears on ZERO-side output line 126 which signal is applied through gate 114, OR gate 88, and line 90 to CPU 10 to cause a trap or interrupt to occur. The undesired transfer of control into section 12A of main memory 12 is in this manner prevented. The signal on line T3 line 33 is followed by a signal on T4 line 34 which is applied to set flip-flop 116 to its ONE state and to reset I flip-flop 47 to its ZERO state.

Assume now that the instruction performed during the second clock cycle described above, which instruction was transfer privileged, was itself a branch instruction and that the entry to this instruction was such that a trap did not occur. Under these conditions, at the end of T4 time, P2 flip-flop 112 and flip-flop 116 would both be in their ONE state. As the instruction branched to is about to be performed, a signal is applied through line 42 to set I flip-flop 47 to its ONE state, and signals are applied through lines 16 to cause the appropriate entry in control memory 14 to be read out. At T1 time a conditioning signal is again applied to AND gate 96. The signal on ONE-side output line 58 from I flip-flop 47 applies a second input to this AND gate. If the instruction transferred to is a control instruction in section 12A of memory, there is also a signal on output line 98 from the S3 field of MDR which signal is applied as an additional input to AND gate 96. If a non-transfer protected instruction from section 12B of main memory 12 is transferred to, there is no signal on line 98 at this time. In either event, since the P2 flip-flop is in its ONE state, AND gate 96 is not fully conditioned and flip-flop 116 remains in its ONE state. At T2 time a signal is again applied through line 32 to AND gates 100 and 102 to cause P2 flip-flop 112 to be set to either its ONE or ZERO state depending on whether the instruction about to be executed is transfer privileged or not (i.e., whether there is a bit in the S4 field of MDR 20). At T3 time gate 114 is again conditioned to pass the signal on ONE-side output line 118 from flip-flop 116 through OR gate 74 and line 76 to CPU 10 to allow the instruction being looked at to be executed and the program to proceed. At T4 time a signal is again applied through line 34 to the ONE-side input of flip-flop 116 and the ZERO-side input of I flip-flop 47. From the above it is seen that when the branch instruction is in a transfer privileged block, the branched to instruction is performed whether it is in a transfer protected block or not.

Three of the four possible conditions which may arise with the transfer control bits have been discussed. The fourth possible condition arises when an instruction which is not transfer privileged causes a branch to an instruction which is not transfer protected. Under these conditions, at T2 time of the cycle during which the instruction which is not transfer privileged is being looked at, there is a 0 bit in the S4 field of MDR 20 and AND gate 102 is therefore fully conditioned to set P2 flip-flop 112 to its ZERO state. However, at T1 time of the following cycle there is a 0 bit in the S3 field of MDR 20 and AND gate 96 is therefore not fully conditioned. Flip-flop 116 therefore remains in its ONE state causing gate 114 to, at T3 time, apply a signal through OR gate 74 and line 76 to CPU 10 to cause the branched to instruction to be executed and the program to proceed.

In the discussion so far the status bits S1–S4 have been set one way for all control programs in section 12A of main memory and have been set another way for all applications programs in section 12B of memory. This, however, has merely been done to simplify the illustrative examples, and the system is, in fact, capable of far greater flexibility in operation. For example, assume that there are two applications programs, designated program 1 and program 2, neither of which is write or transfer privileged, and that there is a block of data, designated block 3, in section 12B of memory which program 1 may use but program 2 may not. There would, therefore be two entries for block 3 in control memory 14, one entry having a program ID for program 1 in its program ID field, and the other entry having the program ID program 2 in this field. The entry for program 1 would have 0's in its S1 and S3 (write protected and transfer protected) fields, and the entry for program 2 would have 1's in these fields. In this way, the nonprivileged program 1 is given access to block 3 while the nonprivileged program 2 is denied access to this block.

In the previous description it has also been noted that the setting of P1 flip-flop 66 or P2 flip-flop 112 has been altered only when X flip-flop 48 is in its ZERO state. In order to understand the reason for this, it is necessary to investigate the function of the X flip-flop. As indicated previously, CPU 10 is capable of generating execute instructions. As instructions of this type requires that the instruction at address N be performed, and that, when this instruction has been performed, control be returned to the instruction following the execute instruction. Under these conditions, it is the privileged nature of the execute instruction rather than the privilege nature of the instruction at address N which controls for protection purposes. For example, if the execute instruction is not in a write privileged area, P1 flip-flop 22 would be set to its ZERO state during the investigation of this instruction. When the instruction at address N is about to be performed, signals are applied to both lines 42 and 43 to set the I and X flip-flops to their ONE state. Therefore, even if the address N is in a privileged area, the P1 flip-flop is not set to its ONE state. If the instruction at address N causes an active store to be performed, and the address to be stored into is in a conditionally protected area, the setting of the P1 flip-flop to its ONE state prior to the performance of the execute instruction causes a trap to be performed in a manner previously described. The X flip-flop functions in a similar manner with respect to status bits S3 and S4.

From the above it can be seen that by suitably setting the status bits of the corresponding entry in control memory 14, any block in main memory 12 may be given access or denied access to any other block in this memory. Further, by providing multiple groups of status bits, one type of access may be permited between two blocks in main memory, and another type of access denied. It is also apparent that while, for illustrative purposes, a write protect and a transfer protect feature has been described, other forms of access protection are also available using the concepts of this invention.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A memory protection system comprising:

first means for indicating whether an instruction which results in said memory being acted upon in a predetermined manner is privileged;

second means for indicating whether the portion of said memory acted upon in said predeterimned manner is conditionally protected;

and means responsive to the combined occurrence of an indication from said first indicating means that said instruction is not privileged and to an indication from said second indicating means that said area of memory is conditionally protected for generating an interrupt.

2. A memory protection system for a main memory the entries of which are grouped in a predetermined manner comprising:

a control memory having an entry for each group of entries in said main memory;

means, responsive to an entry from said control memory for a first group containing an instruction, for determining whether said instruction is privileged;

means, responsive to an entry from said control memory for a second group which contains an entry accessed by said instruction, for determining whether entries in said second group are conditionally protected;

and means responsive to a determination that said instruction is not privileged and entries in said second group are conditionally protected for generating an interrupt.

3. A system of the type described in claim 2 wherein each entry in said control memory contains a field indicating whether entries in the corresponding group in main memory are conditionally protected and a field indicating whether the entries are privileged.

4. A system of the type described in claim 3 wherein said privileged determining means includes means for sampling the privileged indicating field of the indicated entry from said control memory;

and wherein said conditionally protected determining means includes means for sampling said conditionally protected indicating field.

5. A system of the type described in claim 4 wherein each entry in said control memory includes a number of conditionally-protected-indicating fields and a like number of privileged indicating fields, there being a conditionally-protected and privileged indicating pair of fields for each type of access to main memory for which protection is sought;

and wherein said sampling means includes means for sampling the proper field pair for the type of access being performed.

6. A system of the type described in claim 3 wherein there is a plurality of entries in said control memory for each group of entries in said main memory, said plurality of entries including an entry for each group of programs in said main memory which have like protection characteristics.

7. A system of the type described in claim 3 wherein said groups are blocks each containing a like number of entries.

8. A memory protection system for a main memory the entries of which are grouped in a predetermined manner, some of the entries in said memory being instructions which may be fetched and decoded comprising:

a control memory having an entry for each group of entries in said main memory;

means operative each time an instruction in a group in main memory is fetched for sampling an entry in said control memory corresponding to said group to determine if the instruction is privileged;

means operative after said instruction is decoded for sampling an entry in said control memory corresponding to the group containing the entry accessed by said instruction to determine if the accessed entry is conditionally protected;

and means operative, when the fetched instruction is not privileged and the accessed entry is conditionally protected, for generating an interrupt.

9. A system of the type described in claim 8 including means responsive to said privilege determining means for storing an indication as to whether said fetched instruction is privileged;

wherein each entry in said control memory contains a conditionally protected indicating field which is sampled by said conditionally protected determining means;

and wherein said interrupt generating means operates in response to a stored indication that said fetched instruction is not privileged and to the sampling of a conditionally protected indication in said conditionally protected indicating field.

10. A system of the type described in claim 9 wherein there are various types of accesses which may be made to an entry in said main memory;

wherein each entry in said control memory has a privileged indicating field and a conditionally protected indicating field for each type of access;

including a storing means for each type of access for indicating whether said fetched instruction is privileged as to the corresponding type of access;

wherein said means operative when an instruction is fetched samples all of the privileged indicating fields in said control memory entry and sets said storing means in accordance with the contents thereof;

wherein said conditionally protected determining means samples the proper conditionally field for the type of access called for by said fetched instruction;

and wherein said interrupt generating means operates in response to an indication for the storing means for the type of access called for by said fetched instruction and the indication from the sampled conditionally protected indicating field.

11. A system of the type described in claim 10 wherein one type of access which is protected is a write access.

12. A system of the type described in claim 10 wherein one type of access which is protected is a transfer access.

13. A system of the type described in claim 9 wherein said fetched instruction may be an execute type instruction which causes another instruction to be fetched;

including means for inhibiting the indication of said storing means for being altered as a result of the fetching of the instruction caused to be fetched by said execute type instruction.

14. A system of the type described in claim 8 wherein said main memory contains a plurality of programs at least some of which have like protection characteristics;

wherein said control memory contains, for each of said groups of entries in said main memory, an entry for group of programs having like protection characteristics;

and wherein the entries in said control memory sampled by said privileged and conditionally protected determining means are the entries for the program group containing said fetched instruction.

References Cited

UNITED STATES PATENTS

| | | | |
|---|---|---|---|
| 3,263,218 | 7/1966 | Anderson | 340—172.5 |
| 3,264,615 | 8/1966 | Case et al. | 340—172.5 |
| 3,271,744 | 9/1966 | Peterson et al. | 340—172.5 |
| 3,328,765 | 6/1967 | Amdahl et al. | 340—172.5 |
| 3,328,768 | 6/1967 | Amdahl et al. | 340—172.5 |

PAUL J. HENON, *Primary Examiner.*

R. B. ZACHE, *Assistant Examiner.*

UNITED STATES PATENT OFFICE
CERTIFICATE OF CORRECTION

Patent No. 3,377,624 April 9, 1968

Robert A. Nelson et al.

It is certified that error appears in the above identified patent and that said Letters Patent are hereby corrected as shown below:

Column 10, line 20, "conditionally field" should read -- conditionally protected field --; lines 23 and 36, "for", each occurrence, should read -- from --.

Signed and sealed this 12th day of August 1969.

(SEAL)
Attest:

Edward M. Fletcher, Jr.
Attesting Officer

WILLIAM E. SCHUYLER, JR.
Commissioner of Patents